Feb. 1, 1949. R. G. BOURGAIZE 2,460,675
INCLINOMETER
Filed Feb. 9, 1946 2 Sheets-Sheet 1
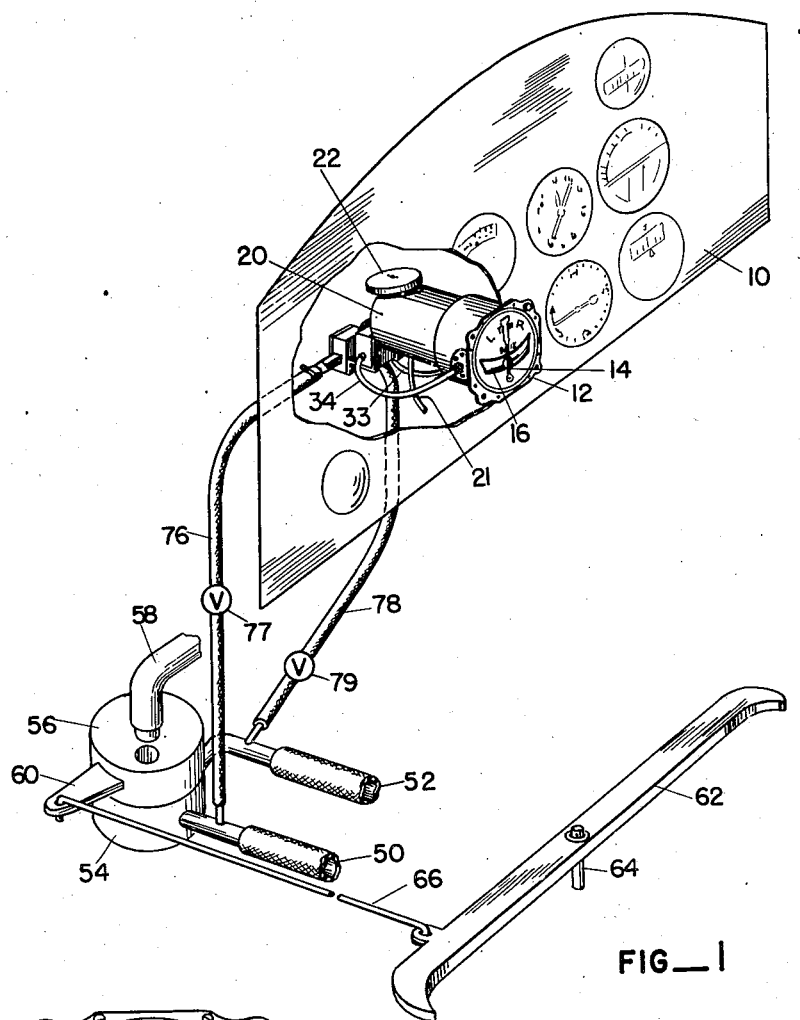
FIG—1
FIG—2
ROBERT G. BOURGAIZE
INVENTOR
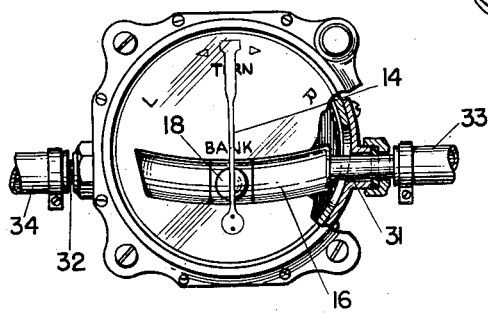
ATTORNEYS Feb. 1, 1949.　　　R. G. BOURGAIZE　　　2,460,675
INCLINOMETER
Filed Feb. 9, 1946　　　　　　　　　　2 Sheets-Sheet 2
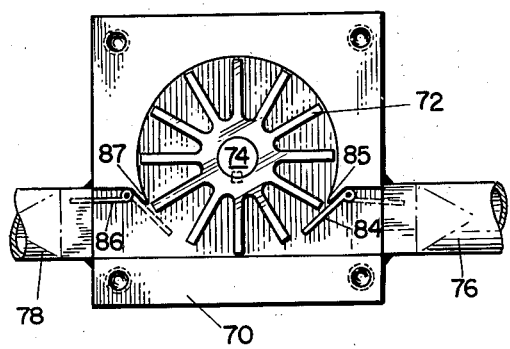
FIG_4
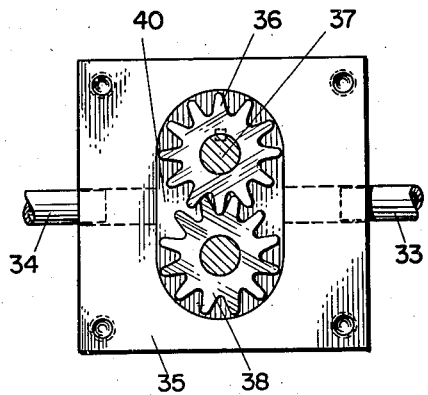
FIG_5
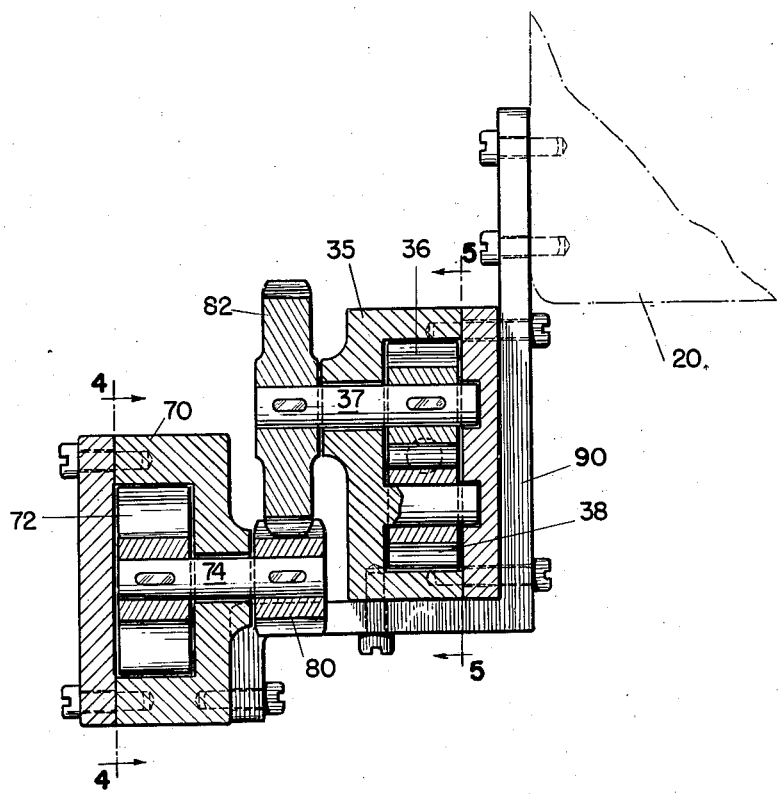
FIG_3
ROBERT G. BOURGAIZE
INVENTOR
BY　*Smith & Tuck*
ATTORNEYS Patented Feb. 1, 1949

2,460,675

UNITED STATES PATENT OFFICE 2,460,675

INCLINOMETER

Robert G. Bourgaize, Tacoma, Wash.

Application February 9, 1946, Serial No. 646,640

8 Claims. (Cl. 35—12)

My invention relates to an inclinometer and, more particularly, to an inclinometer which simulates centrifugal force in non-flying aircraft trainers.

In the training of aircraft pilots it is customary to provide a miniature aeroplane mounted upon a universal support adapted for rotation, tilting, and tipping in all normal flying positions, in which the trainee is placed and given the essential instruments and control elements in order that he may practice, by simulation, flight.

In such trainers it has heretofore been customary to include actual instruments as used in aircraft except in the case of the turn-and-bank indicator. In this instance, a modified inclinometer is employed in the turn-and-bank indicator, which inclinometer is mounted to revolve and is linked to the gyro which operates the turn lever so that the ball and tube of the inclinometer will rock when the gyro precesses. The effect is somewhat similar to conditions encountered in actual flight, in that the ball in the tube of the inclinometer moves to a low point in the tube, but the effect departs from actuality in that the tube is rocking, which is not the case in normal flight. The purpose of rocking the tube is to simulate centrifugal force, which is of course absent. Such an instrument is not fully satisfactory, because, when the trainee has become familiar with the rocking tube and ball of the trainer, he finds an entirely foreign situation when he encounters the actual instruments in an aircraft.

Having in mind the prior art devices, it is an important object of my invention to provide an inclinometer for aircraft trainers that faithfully simulates the action of centrifugal force in actual aircraft flight.

Another object of my invention is the provision, in an inclinometer of the type described, of a movable ball in a curved transparent tube, which readily assumes the normal aspects of actual flight, even though employed in a trainer in which it is not responsive to centrifugal force.

A still further and more specific object of my invention is to provide an inclinometer of the type described which is simple to construct, is readily responsive to signals imparted thereto, and which accurately reproduces an action similar to the actual application of centrifugal force.

The foregoing objects and others ancillary thereto I prefer to accomplish as follows. According to a preferred embodiment of my invention, I provide in a turn-and-bank indicator of non-flying aircraft means forming a closed-circuit fluid passage, including therein the normal transparent inclinometer portion which encloses a free-rolling ball. In this circuit is means causing fluid to flow in either direction through the passage, and to thus effect movement of the ball in either direction. Such means to move the fluid is responsive to the application to the trainer by the trainee of either left or right rudder. Specifically, the inclinometer tube is placed in closed circut with a gear pump and the circuit is filled with a fluid. The pump is operated by suction normally available in the trainer and for this purpose a suction operated rotor is employed, which rotor is in circuit with the main conduits to an air motor employed in the trainer to turn the same and which motor responds to the application of left or right rudder.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which:

Fig. 1 is a schematic view in perspective of an instrument panel of a trainer aircraft, also showing the rudder bar and the main air valve which controls turning of the trainer.

Fig. 2 is an enlarged face view of a turn-and-bank indicator embodying my invention;

Fig. 3 is a vertical sectional view through the pump and pump operating means employed in connection with my improved inclinometer;

Fig. 4 is a vertical view taken on line 4—4 of Figure 3; and

Fig. 5 is a vertical elevational view taken on line 5—5 of Figure 3.

An inclinometer to overcome the defects hereinbefore enumerated, must have at least two totally distinct characteristics. It must be real in appearance and operate in simulation of an inclinometer in flyable aircraft; and it must be simple to construct, maintain and operate in effecting the simulation of centrifugal force in an aircraft trainer.

Accordingly, a preferred embodiment of my invention, referring to Figures 1 and 2 of the drawings, is constituted by a closed-circuit fluid passage, which includes a transparent inclinometer portion, having a ball therein and means to move the fluid in either direction in the passage in response to the application to the trainer of either left or right rudder.

The numeral 10 designates an instrument panel having mounted therein a plurality of instruments as normally employed in aircraft and including for my purpose a turn-and-bank indicator 12 of the type employing a gyro operated needle 14 to indicate the direction of turn and an inclinometer comprising a curved transparent tube 16 having therein a ball 18. The gyro is contained within the case 20 to the rear of the instrument face and is operated by suction applied to conduit 21 through the function of air introduced through port 22, which air strikes the rotor of the gyro enclosed in case 20.

The tube 16 is fixedly mounted in the case 20 in a manner to be visible through the dial face and is similar in all respects to a normal inclinometer tube, except that at each end it is provided with extensions indicated as 31 and 32, which are respectively connected to conduits 33 and 34, that are let into opposite sides of a gear case 35 containing the driving gear 36 on shaft 37 and the driven gear 38 in mesh therewith.

The pump gears are contained in a chamber 40, shown in Fig. 5, which pump, with conduits 33 and 34, and the space inside tube 16, constitutes a closed-circuit fluid passage, which is normally filled with a liquid. Rotation of the driven gear 36 in either direction provides a relative directional flow of liquid in either direction throughout the circuit. When liquid is flowing from left to right in Fig. 2, the tendency is for the ball 18 to move to the right. Conversely, when liquid is flowing from the pump through conduit 33, through tube 16 and conduit 34, the tendency is for the ball 18 to move to the left.

In trainer aircraft such as is shown in the patent to Link, issued November 23, 1937, No. 2,099,857, there is employed a turning motor which responds to suction applied to either side of the motor through conduits, which in this application are designated 50 and 52, which are let into a valve body 54 suitably mounted in the aircraft. The valve includes the superposed rotatable portion 56 that is connected with a manifold 58 and may have on one side the outstanding arm 60. A rudder bar 62 pivoted on pin 64 is connected with arm 60 by a link 66. When pressure is impressed upon the left end of the rudder 62 to turn it clockwise, a similar rotation is obtained in the valve member 56 and suction through manifold 58 is applied to the line 50. In a similar counter-clockwise movement of the rudder there is obtained counter-clockwise movement of the valve member 56 and in this instance suction is applied to line 52.

An air motor shown in Fig. 4 comprises case 70 having therein the rotor 72 keyed to shaft 74. A suction line 76 runs from case 70 to the turning motor suction line 50. A second suction line 78 runs between the case 70 and line 52. When suction is applied to line 52, the rotor 72 turns in a clockwise direction as seen in Fig. 4, and when suction is applied to line 76, the rotor turns in a counter-clockwise direction in the same view.

Shaft 74 has keyed thereto a pinion 80 and a gear 82 is likewise keyed to shaft 37. Through this gear train rotation of the rotor 72 imparts relative rotation of the gears 36 and 38 and induces a flow of fluid through the passage, including the inclinometer tube 16. The inclinometer is mounted crosswise in the trainer aircraft. If the trainee applies left rudder, without applying the proper lateral tilt to the aircraft the flow of fluid through the circuit, including the inclinometer, will be such that the ball 18 will move to the right in simulation of a skid or move to the left in simulation of a side slip, depending upon the degree of bank he employs. If he makes a proper bank, the force of gravity upon the ball and the degree of flow of liquid through the inclinometer tube will counteract each other and the ball will assume a neutral position in the middle of the tube.

In Fig. 1 the conduits 76 and 78 are shown to include metering or limiting valves 77 and 79, respectively, for the purpose of permitting the accommodation of the inclinometer to the simulation of conditions normal with various types of aircraft.

Communication of the conduits 76 and 78 with the chamber in which operator rotor 72 is reduced in either direction when air enters the chamber by the dependently pivoted gates 84 and 86 which swing widely open when suction is applied to the line with which the gate is associated. These gates swing to provide a reduced opening when air is entering the chamber through the line with which the gate is associated and such opening is determined by the gate abutting an adjacent stop provided in the casing means forming the chamber of the rotor. The stops are designated 85 and 87.

As shown in Fig. 3, the gear case 35 and the motor case 70 are mounted upon a bracket 90 suitably attached to the gyro case 20.

While I have shown and described particular embodiments of my invention, it will occur to those skilled in the art that various changes and modifications may be made without departing from the invention, and I therefore aim in the appended claims to cover all such changes and modifications as fall within the true spirit and scope of my invention.

Having thus described my invention, I claim:

1. A centrifugal-force simulation inclinometer for non-flying aircraft trainers having a rudder and rudder control means, comprising: an open-ended curved transparent tube enclosing a ball free to roll therein, a reversible gear pump, fluid conduit means placing each side of said pump in communication with an end of said tube, and suction-operated means to operate said pump in either direction in response to the application to the trainer of either left or right rudder.

2. A centrifugal-force simulation inclinometer for non-flying aircraft trainers having a rudder and rudder control means, comprising: an open-ended curved transparent tube enclosing a ball free to roll therein, a reversible gear pump, fluid conduit means placing each side of said pump in communication with an end of said tube, and means to operate said pump in either direction in response to the application to the trainer of either left or right rudder.

3. A centrifugal-force simulation inclinometer for non-flying aircraft trainers having a rudder and rudder control means, comprising: an open-ended curved transparent tube enclosing a ball free to roll therein, a positive displacement reversible fluid pump, fluid conduit means placing each side of said pump in communication with an end of said tube, and suction operated means to operate said pump in either direction in response to the application to the trainer of either left or right rudder.

4. A centrifugal-force simulation inclinometer for non-flying aircraft trainers having a rudder and rudder control means, comprising: an open-ended downwardly curved transparent tube enclosing a ball free to roll therein, reversible pump means, fluid conduit means placing each side of said pump means in communication with an end of said tube, and means to operate said pump in either direction in response to the application to the trainer of either left or right rudder.

5. A centrifugal-force simulation inclinometer for non-flying aircraft trainers having a rudder and rudder control means, comprising: an open-ended curved transparent tube enclosing a ball free to roll therein, a positive displacement reversible fluid pump, fluid conduit means placing each side of said pump in communication with an end of said tube, and means to operate said pump in either direction in response to the application to the trainer of either left or right rudder.

6. A centrifugal-force simulation inclinometer for non-flying aircraft trainers having a rudder and rudder control means, comprising: an open-ended curved transparent tube enclosing a ball free to roll therein, a pump, fluid conduit means placing said pump in communication with each end of said tube, and means to control the operation of said pump to cause fluid to flow in either direction through said tube in response to the application to the trainer of either left or right rudder.

7. A centrifugal-force simulation inclinometer for non-flying aircraft trainers having a rudder and rudder control means, comprising: means forming a closed-circuit fluid passage including a transparent inclinometer portion having a free-rolling ball therein, a reversible pump and means to operate the same to move fluid in either direction in said passage and past said ball, and means to control the operation of said pump to cause fluid to flow in either direction through said passage, said means being responsive to the application to the trainer of either left or right rudder.

8. A centrifugal-force simulation inclinometer for non-flying aircraft trainers having a rudder and rudder control means, comprising: means forming a closed-circuit fluid passage including a transparent inclinometer portion having a free-rolling ball therein, and means to cause fluid to flow in either direction through said passage, said means being responsive to the application to the trainer of either left or right rudder.

ROBERT G. BOURGAIZE.

REFERENCES CITED

The following references are of record in the file of this patent:

UNITED STATES PATENTS

| Number | Name | Date |
|---|---|---|
| 2,197,890 | Koster | Apr. 23, 1940 |

FOREIGN PATENTS

| Number | Country | Date |
|---|---|---|
| 530,764 | Germany | Aug. 1, 1931 |